Figure 1:
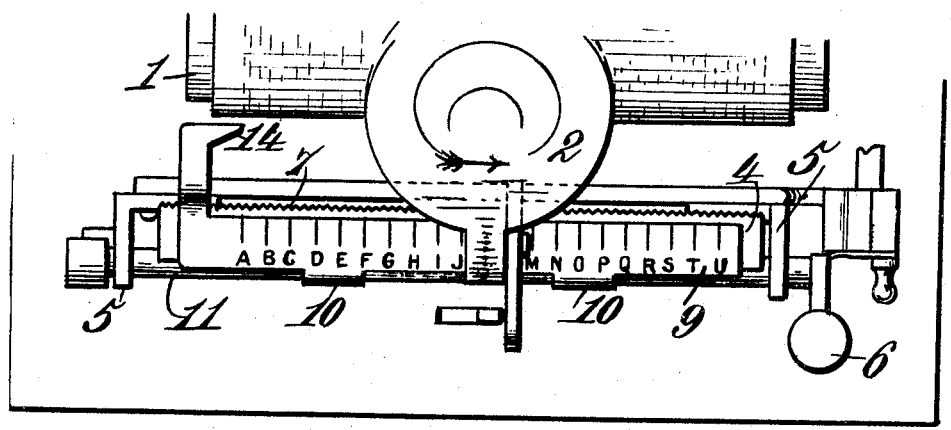

No. 794,599. PATENTED JULY 11, 1905.
N. C. DURAND.
SOUND RECORD LOCATING DEVICE.
APPLICATION FILED MAR. 18, 1905.

2 SHEETS—SHEET 1.

Witnesses
Inventor,
Nelson C. Durand.

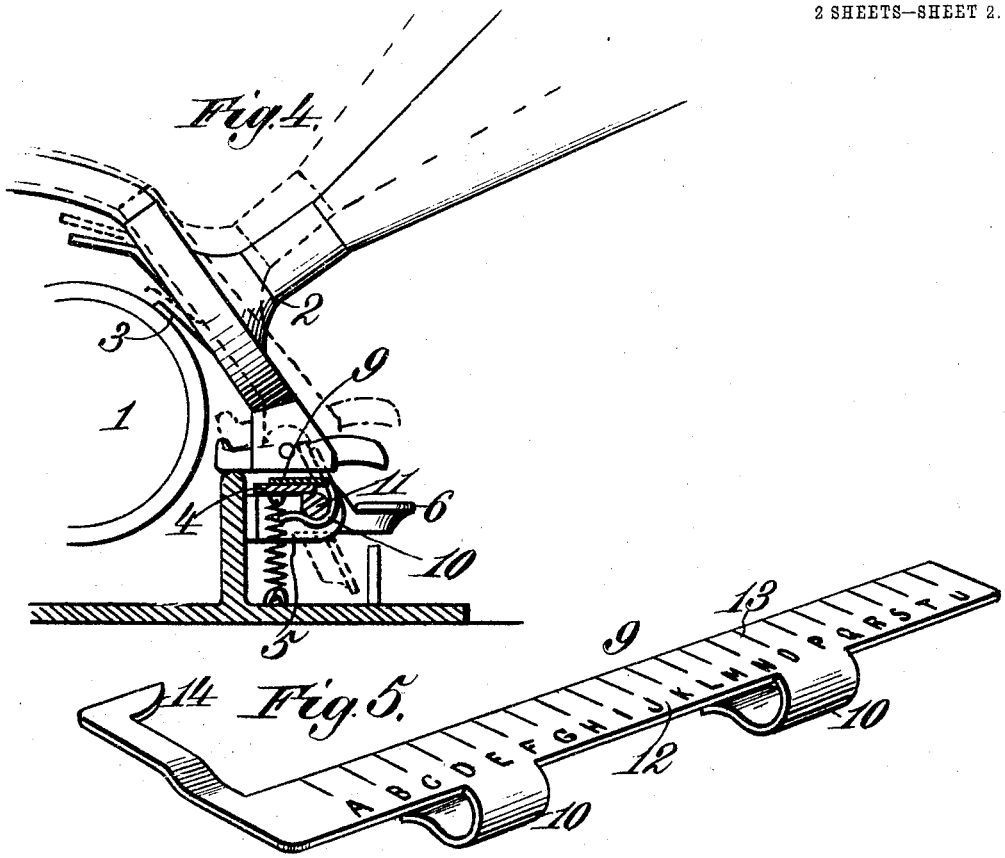

No. 794,599. Patented July 11, 1905.

UNITED STATES PATENT OFFICE.

NELSON C. DURAND, OF SCRANTON, PENNSYLVANIA, ASSIGNOR TO INTERNATIONAL TEXTBOOK COMPANY, OF SCRANTON, PENNSYLVANIA, A CORPORATION OF PENNSYLVANIA.

SOUND-RECORD-LOCATING DEVICE.

SPECIFICATION forming part of Letters Patent No. 794,599, dated July 11, 1905.

Application filed March 18, 1905. Serial No. 250,832.

*To all whom it may concern:*

Be it known that I, NELSON C. DURAND, a citizen of the United States, residing at Scranton, in the county of Lackawanna and State of Pennsylvania, have invented new and useful Improvements in Means for Locating Matter Engraved on the Records of Sound-Reproducing Apparatus, of which the following is a specification.

My invention relates to a means or device to facilitate the ascertainment of the position or location of any desired sound—such as a word, phrase, or other succession of words—upon the record of a sound-reproducing apparatus, to the end that repetitions of desired sounds or of words may be had quickly and distinctly unassociated with sounds or words which the user does not desire to hear repeated.

My invention is intended particularly for use in connection with records containing courses of study—for example, language-lessons—and in the following specification will be described as applied to such use, although it will be understood that I do not restrict my invention to any particular use, but claim it for all the various uses for which it may be adapted.

In the instruction of languages or words or phrases of languages by the use of sound-reproducing apparatus the lessons are spoken by a professor of the language to an apparatus and graved on master-records, and a course of language-lessons covers approximately about twenty-five records. From the master-records numerous other records are produced and are sent to students of the language and are repeated to them by a sound-reproducing apparatus, making up a system by which great results have been secured, since the student has his instructor always present and may have the lessons repeated as often as he may desire. Very often the student will desire to hear repeated some word or words or a passage with respect to the proper pronunciation or formation of which he is in doubt quickly and without having first to listen to sounds, words, or phrases other than that in which he is for the time being interested in order that he may hear just the sound or sounds repeated to him quickly and distinctly and unassociated with other sounds. This desirable result it is the object of my invention to secure, and with such object in view the invention consists in a means or appliance suitably associated with a sound-reproducing apparatus and bearing suitable indicia corresponding to like indicia associated in a guide (such as a dictionary or lexicon) with the various sounds, words, or succession of words engraven on the records.

I claim my invention generically and specifically as hereinafter set forth.

Figure 2:
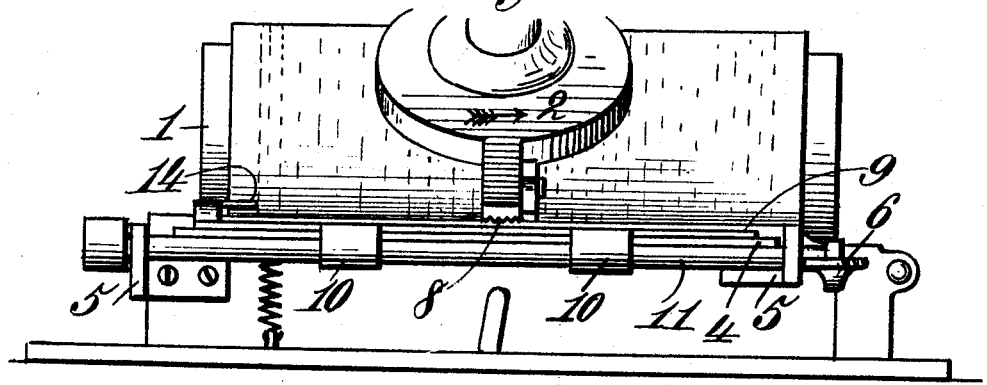
Figure 3:
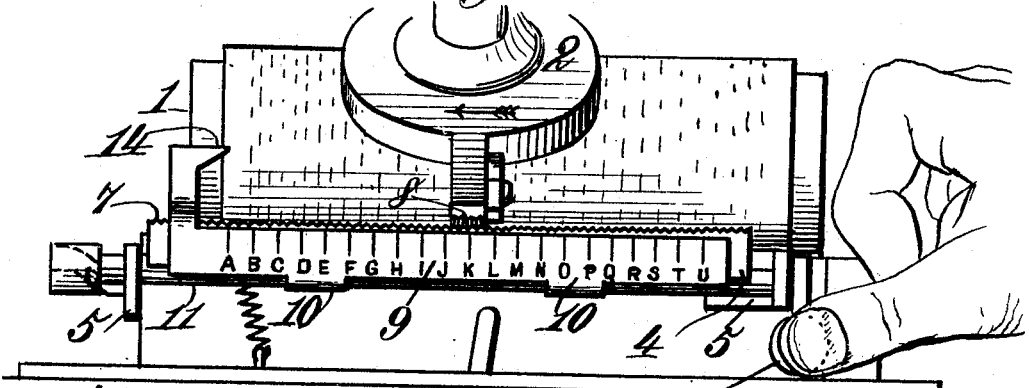

In the accompanying drawings, illustrating my invention, wherein I have shown it as embodied in connection with a well-known type of sound-reproducing apparatus provided in a known manner with what is called "repeating attachment," but to which type of apparatus or to repeating attachments my invention is not restricted, Figure 1 is a plan view of a sound-reproducing apparatus associated with which is my improved index-scale. Fig. 2 is a front elevation. Fig. 3 is a view similar to Fig. 2, showing the position of the parts when the repeating attachment has been actuated for the purpose of setting back the stylus to a position to repeat matter which has just immediately preceding been spoken by the apparatus. Fig. 4 is a sectional view. Fig. 5 is a detail perspective of my improved index-scale. Fig. 6 is a view of a guide, such as a lexicon or dictionary, having indicia corresponding with the indicia of the index-scale associated with the sounds, words, or succession of words engraven on the records.

In the said drawings the reference-numeral 1 designates the record-holder of a sound-reproducing apparatus, 2 the speaker-arm, and 3 the stylus.

4 designates the speaker-arm-lifter bar of a known type of repeating attachment, which is journaled in suitable brackets 5, carried by the framework of the apparatus, and 6 a thumb-lever by which said bar 4 may be rocked. The bar 4 is provided on one edge with teeth 7, which coact with teeth 8 on the speaker-arm to set said speaker-arm back in position to repeat that which has just been spoken before the thumb-lever is depressed and the bar 4 rocked to lift the speaker-arm and stylus from the phonographic record.

The repeating attachment and sound-reproducing apparatus generally are known and need not to be further described, as they form no part of my invention and are illustrated merely to show one operative embodiment of my invention.

In this illustrated embodiment the numeral 9 designates an index-scale, which, as shown, is adjustably and detachably connected to the apparatus by means of clips 10, which fit about the journal-rod 11 of the lifter-bar 4. It may be otherwise associated with the sound-reproducing apparatus or repeating attachment, and, as will be understood, may be used in connection with apparatus not provided with a repeating attachment, and may be fixedly or adjustably connected with the apparatus. This index-scale 9 is provided with suitable indicia 12, that shown consisting of letters—for instance, from "a" to "u." It may also be, and preferably is, provided with leader-lines 13 to facilitate the positioning of the stylus opposite any given indicia. When the index-scale is arranged to be detachably connected to the phonograph apparatus, it is capable of adjustment with relation to the records arranged upon the holder 1 and will be provided with a pointer 14, the point of which, to secure greater accuracy, will be brought into coincidence with the commencement of the engraved lines on the record, so that the indicia of the scale will constitute an exact index with respect to the matter engraven in the record. This is desirable in that frequently the engraving of one record does not begin at exactly the same place thereon as the engraving on others, at times there being slightly more unengraved margins on some records than on others. By providing for adjustability of the index-scale said scale may be adjusted with the greatest nicety to the engravings on any given record. While desirable, however, it may not be indispensable, because any difference in point of commencement of engraving on different records is very slight, and satisfactory results are secured even though the index-scale be not adjustably arranged.

The reference-numeral 15 designates a guide—for instance, a lexicon or dictionary or of other description—in which all the sounds, words, or phrases or other succession of words are contained in regular succession according to their engraved relation on a record, and associated with these various sounds or words are indicia 16, corresponding to the indicia on the index-scale, there being a fixed relation between such indicia. In practice each record in a course of language-lessons, of which, as stated, there are approximately twenty-five, is numbered consecutively from "1" on throughout the series of records. The guide in addition to the indicia 16 will have combined therewith a number of the record on which a given sound, word, or phrase or other succession of words will be found, as indicated at *a*. In the illustrated example of guide or lexicon the arrangement of words in said guide accords with or follows in succession the words engraven on a given record—say record No. 15. This, it will be understood, is but a simple example set out for simplicity. Where a complete lexicon or dictionary alphabetically arranged is made use of, the order of words may or may not bear the same interrelation that is sustained by the word or words of any given cylinder or cylinders; but it may be that, for example, the French word "*mais*" will be upon one cylinder and the word "*parler*" upon a different cylinder, as indicated by the numerals "15" and "7" appearing opposite to those words in the illustrated guide. This, however, is but an extension of the more simple idea of arrangement shown in the guide and does not differ in anywise in principle.

In preparing my invention for use a suitable mode of procedure would be as follows: A record will be introduced into a sound-reproducing apparatus and the index-scale 9, if it be a detachable one, adjusted thereto and the operation of the apparatus commenced. As each sound or word or phrase or other succession of words is spoken by the instrument the position of the stylus with relation to the engraving on the record and the indicia on the scale is observed in any suitable way, as by means of the edge of the speaker-arm 2, and the sound or word or phrase or other succession of words are written down, and an indicia character corresponding with that on the index-scale with which the edge of the speaker-arm registers as the sound, word, phrase, or succession of words is enunciated is placed in front of or in other suitable relation thereto, and the number of the cylinder is also noted, as indicated at 16 and *a* in Fig. 6 of the drawings, and the guide 15, whether it be a textbook or lesson-book or lexicon or dictionary or of other character, may be compiled or arranged from this data. There will thus be had a guide for each cylinder having the sounds or words contained on the cylinder and in the same relation and having arranged in connection therewith indicia corresponding to that on the index-scale, so that at any time the student may desire to hear repeated clearly and distinctly, for instance, the French word "*parler*" he will see from the guide that said word is on cylinder No. 7 and at point "h," and having this knowledge he can quickly introduce cylinder No. 7 into the phonographic apparatus and adjust the stylus at a point on the record corresponding to point "h" on the index-scale, and the instrument will speak the word "*parler*" quickly and without running over the entire engraving on the record, as was necessary prior to my invention.

Having thus fully described the invention, what is claimed as new is—

1. A device for locating the position of matter engraved on the record of a sound-reproducing apparatus, consisting of a scale-index provided with indicia corresponding to indicia contained in a guide, and provided also with means whereby it may be adjustably connected to the apparatus.

2. A device for locating the position of matter engraved on the record of a sound-reproducing apparatus, consisting of a scale-index provided with indicia corresponding to indicia contained in a guide, and provided with means whereby it may be detachably and adjustably connected to the apparatus.

3. A device for locating the position of matter engraved on the record of a sound-reproducing apparatus, consisting of a scale-index provided with a pointer and with indicia corresponding to indicia contained in a guide.

4. A device for locating the position of matter engraved on the record of a sound-reproducing apparatus, consisting of a scale-index provided with indicia corresponding to indicia contained in a guide provided with means for detachably connecting said scale-index to the apparatus, and provided also with a pointer.

In testimony whereof I have hereunto set my hand in presence of two subscribing witnesses.

NELSON C. DURAND.

Witnesses:
 DAVID COATE,
 S. P. ALLE.